May 15, 1928.  
W. W. MORRAL ET AL  
CORN HUSKING MACHINE  
Filed Dec. 17, 1925  
1,669,483  
2 Sheets-Sheet 1
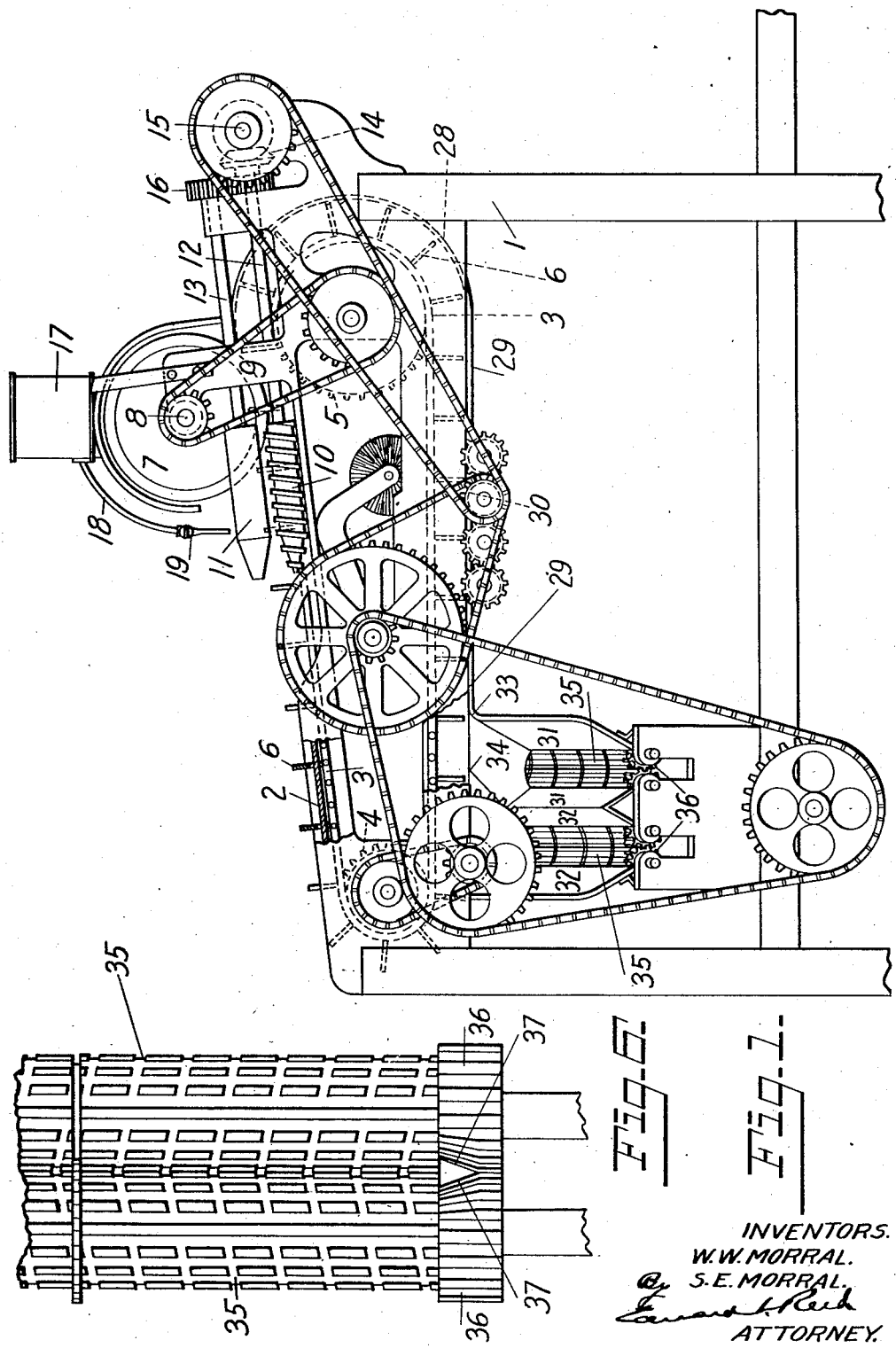
INVENTORS.  
W. W. MORRAL.  
S. E. MORRAL.  
ATTORNEY.

May 15, 1928. 1,669,483
W. W. MORRAL ET AL
CORN HUSKING MACHINE
Filed Dec. 17, 1925 2 Sheets-Sheet 2
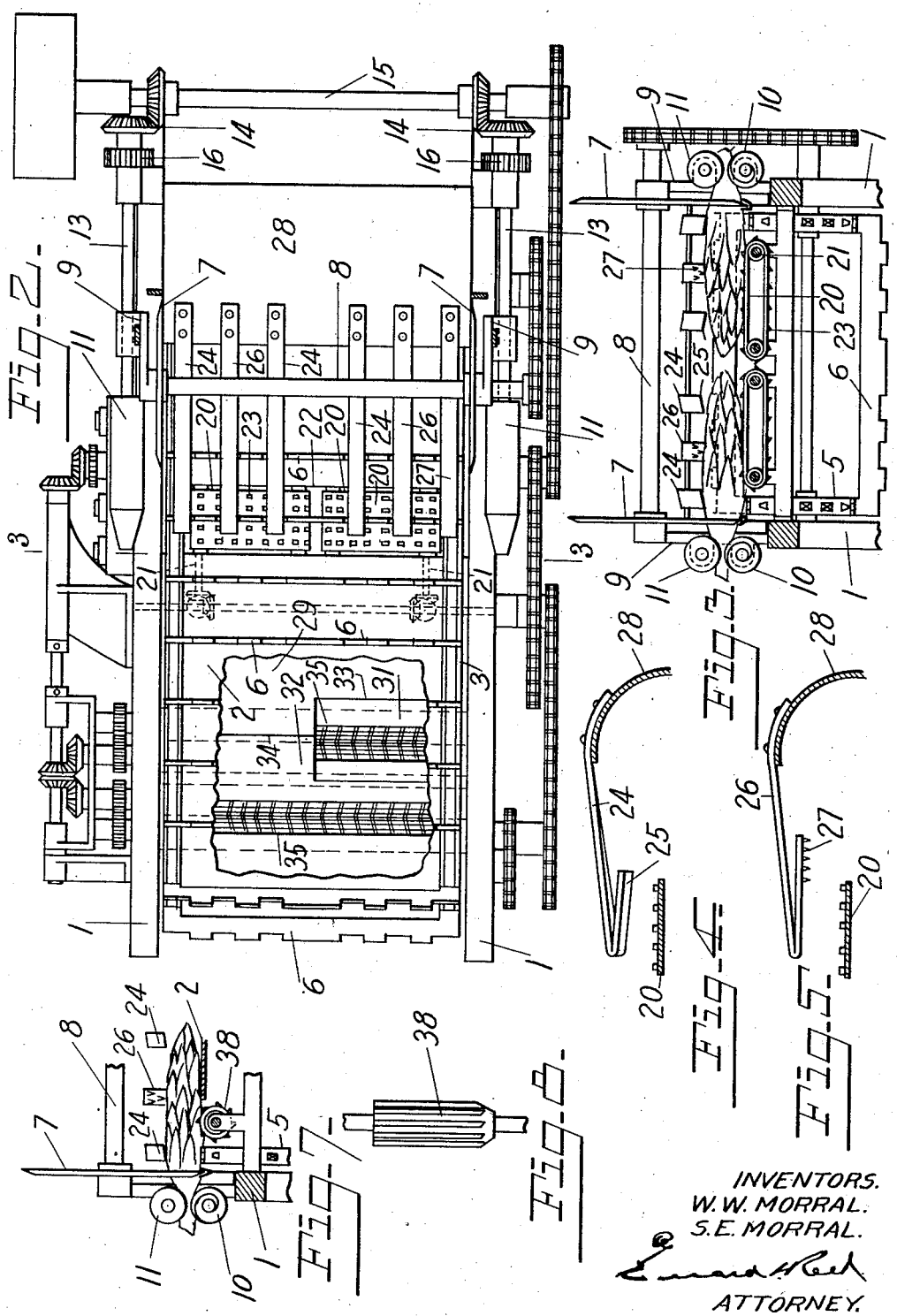
INVENTORS.
W. W. MORRAL.
S. E. MORRAL.
ATTORNEY.

Patented May 15, 1928.

1,669,483

UNITED STATES PATENT OFFICE.

WILLIAM W. MORRAL AND SAMUEL E. MORRAL, OF MORRAL, OHIO.

CORN-HUSKING MACHINE.

Application filed December 17, 1925. Serial No. 75,954.

This invention relates to corn husking machines and one object of the invention is to provide a husking machine of a well known type which will have an increased efficiency in operation and which can be produced at a relatively low cost.

A further object of the invention is to provide a corn husking machine with a gaging device of such a character that it will accurately position ears of all sizes and advance the butts thereof toward the butt removing device.

A further object of the invention is to provide a corn husking machine with means for preventing the elements of the gaging device from filling up or becoming gummed up in such a manner as to interfere with the proper operation thereof.

A further object of the invention is to provide a corn husking machine having a very simple and highly efficient device for moving the ears into engagement with the gaging devices.

A further object of the invention is to provide a corn husking machine with means for preventing the accumulation of husks at the ends of the husking rollers in such a manner as to interfere with the movement of the ears along the husking rollers.

Other objects of the invention will appear as the machine is described in detail.

In the accompanying drawings Fig. 1 is a side elevation of a corn husking machine embodying our invention; Fig. 2 is a top plan view of the same, partly broken away; Fig. 3 is a transverse sectional view taken on the line 3—3 of Fig. 2; Fig. 4 is a side elevation of one of the resilient pressure devices; Fig. 5 is a side elevation of the husk loosening device; Fig. 6 is a plan view of a portion of one pair of husking rollers showing the means for preventing the accumulation of husks at the ends thereof; Fig. 7 is a sectional view showing a slightly modified form of the transverse feeding device; and Fig. 8 is a detail of the feeding roller shown in Fig. 7.

In these drawings we have illustrated one embodiment of our invention and have shown the same as applied to a corn husking machine of a well known type but it will be understood that the various improvements may be applied to corn husking machines of different kinds and that the improvements themselves may take various forms without departing from the spirit of the invention.

In that particular embodiment of the invention here shown the corn husking machine comprises a main frame 1 on the upper portion of which is supported a table 2 which is preferably inclined as shown. The ears of corn are placed on the lower end of this table by hand, or otherwise, and are moved lengthwise thereof by a conveyor which is here shown as of the endless type and as comprising sprocket chains 3 which travel about sprocket wheels 4 and 5 arranged beneath the respective ends of the table 2 and as having secured thereto cleats or "flights" 6 which travel above the upper surface of the table to engage the ears and move the same along the table. These cleats may be of any suitable character but are here shown as transverse bars carried by the sprocket chains and spaced therefrom so as to permit them to travel above the table.

Mounted at the side of the table near the discharge end thereof is a butt removing device. In the present instance we have shown the invention as applied to a double corn husker, that is, a corn husker in which the table is of such a width that two ears can be placed thereon end to end in advance of each cleat and which is provided at each side thereof with a butt removing device so that two ears can be operated on simultaneously. The two butt removing devices and their associated parts are identical in construction and we will therefore describe but one of the butt removing devices and it will be understood that the description and the reference numerals apply to both butt removing devices. As here shown, each butt removing device comprises a circular cutter 7 which is mounted on a shaft 8 journaled in bearings carried by brackets 9 extending upwardly from the main frame 1 on the respective sides of the table. The table is provided at its edges with parts serving as cutter bars to cooperate with the circular cutters and support the ear during the cutting operation. Arranged at the side of the table 2 and in advance of the butt removing device is an ear gaging device to properly position the ear with relation to the cutter so that the whole butt will be removed and without removing any portion of the corn. This gaging device is here shown as comprising two parallel rollers 10 and 11 arranged one above the other and spaced a short distance apart, the rollers being so arranged that the space between them will be substantially in line with the butts of the ears which are being moved along the table 2, so that when these ears are moved transversely to the table the butts will enter the space between the two gaging rollers. The gaging rollers 10 and 11 are carried by shafts 12 and 13 one of which is driven by beveled gearing 14 from a shaft 15 mounted at the rear end of the frame 1, and the two shafts are connected by intermeshing gears 16 to cause them to be rotated in opposite directions. Both rollers preferably have their forward ends tapered to facilitate the entrance of the stem or butt of the ear between them should the stem extend into line with the rollers as the ear is advanced toward the same. One of the rollers, preferably the lower one 10, has a spiral rib extending lengthwise thereof to engage the butt of the ear and advance the same along with the body of the ear as the latter is advanced by the conveyor toward the cutter. The other roller, in the present instance the upper roller 11, has a smooth cylindrical surface which cooperates with the spiral roller to properly position the ear with relation thereto and to advance the same toward the cutter. Machines of this sort have heretofore been equipped with gaging devices comprising two spiral rollers and also with gaging devices comprising a single spiral roller and a fixed gaging bar associated with the spiral roller. While both these former types of gaging devices have operated fairly well both have developed objectionable characteristics which are entirely overcome by the present gaging device. Where two spiral rollers are employed there is a tendency for the rollers to draw the smaller ears in between them and thus either draw the ear entirely through the rollers or move the same over so far that a portion of the ear will be severed by the cutter. When a single spiral roller is used in connection with the stationary bar this bar interferes with the movements of the ear so that the latter is not positioned and advanced toward the cutter in an entirely satisfactory manner. With the present construction of gaging device the smooth upper roller prevents the ears from being drawn too far between the rollers and causes the same to be accurately positioned with relation to the cutter. At the same time the smooth roller does not retard or interfere with the movement of the ear but permits the same to not only move into an accurate position with relation to the cutter but to be moved smoothly and uniformly toward the cutter by the spiral roller.

Under some conditions of operation the frictional contact between the gaging rollers and the ears of corn is so increased as to cause the ears to be drawn too far between the rollers, thus misplacing the ear with relation to the cutter and causing a portion thereof to be severed. This excessive friction is frequently due to partially dried husks, which cause the rollers to heat, and which sometimes exude gummy matter which will adhere to the rollers. We have found that this difficulty can be entirely overcome by applying a liquid, such as oil or even water, to the rollers. This liquid may be applied to the rollers in various ways but, in the present machine, we have provided a liquid receptacle 17 which is here shown as supported on the bracket 9 above the cutter. A conduit 18 leads from this receptacle to a point adjacent to the upper roller 11 and has its end so arranged that it will discharge the liquid onto this roller, from which a portion of it will drip onto the lower roller. The liquid is delivered to the rollers in very small quantities and we have shown the conduit 18 as provided with a valve 19 by means of which the flow of liquid may be regulated. The application of liquid to the rollers serves to lubricate the same and to not only reduce the frictional contact between the rollers and the ear of corn but also to prevent the heating of the rollers and to prevent the adhesion of gummy matter to the rollers, and consequently the rollers will not grip the butt of the ear sufficiently to draw the same between the rollers.

Inasmuch as it is not practical to so place the ears by hand as to cause them to properly engage the gaging rollers we have provided a placing device which serves to move the ears transversely to the table 2 and cause the butt ends thereof to engage the gaging rollers. As here shown, this device comprises an endless belt 20 which is mounted on drums 21 rotatably mounted beneath the table and so driven that the upper stretch of the belt will move transversely to the table toward the gaging rollers. The table itself is provided with a transverse opening, as shown at 22, in which the upper stretch of the belt lies, the belt being so positioned that its upper surface will be flush with or slightly above the level of the table so that it will receive the ears and form the sole support therefor during their transverse movement. Preferably the surface of the belt is roughened and it is here shown as provided with teeth 23 which will bite into the husk of the ear and cause the same to move with the belt. The ear is pressed firmly into engagement with the belt by suitable resilient pressure devices which are preferably in the form of springs 24 mounted on a fixed part of the frame above the table, and the forward ends of which are bent rearwardly, as shown at 25, in Fig. 4, to provide contact surfaces which will engage the ears while they are supported by the transversely movable belt 20. Because of the resiliency of these pressure devices they will accommodate themselves to ears of various sizes and hold the ear firmly in contact with the belt without exerting too much pressure on the large ear or too little pressure on the small ear. The contact portions of the springs are preferably inclined in the direction of movement of the belt so that the rear edge thereof will not bite into the husk and thus interfere with the movement of the ear by the belt.

If desired, a husk loosening device may be also provided for loosening the outer husks of the ear to facilitate their engagement by the husking rollers and, as here shown, this husk loosening device is in the form of a spring 26 supported between the two pressure springs 24 and having its forward end bent rearwardly and provided with teeth 27 which will engage the husk of the ear and loosen the same as it is forced beneath the toothed contact portion of the spring by the main conveyor. The toothed portion of the husk loosening device is preferably arranged beyond the ear placing belt 20 so that it will not interfere with the movement of the ear by that belt.

The main conveyor carries the ears along the table 2 past the butt removing device and thence through a chute 28 to a lower table 29, this table being so arranged with relation to the conveyor that the cleats will continue to move the ears along this lower table. Interposed between the ends of the lower table are a plurality of husking rollers 30 which engage the husks on the ear and strip the same therefrom. In practice, however, these husking rollers will not always remove the entire husk but will leave portions of the inner husk adhering to the ear. It has therefore been found desirable to provide additional husking rollers to remove the remaining portion of the husk. As here shown the table 29 terminates in two inclined chutes 31 and 32, which are placed side by side and the table cut away, as shown at 33 and 34, to cause the two rows of ears, at the respective sides of the table, to be discharged respectively into the chutes 31 and 32. Arranged in the respective inclined chutes 31 and 32 and forming the bottoms thereof are husking rollers 35 which are mounted in inclined positions corresponding to the inclinations of the chutes. As the ears are dropped from the table into the chutes they will be supported by the husking rollers and will move along the same by gravity, the husking rollers gripping the remaining husks and removing the same therefrom as the ears move downwardly. To prevent an accumulation of small pieces of husks and silk at the lower end of the husking rollers, which would interfere with the discharge of the ears from the rollers, we have provided the rollers of each pair of husking rollers at their lower ends with gears 36, arranged to rotate with the respective husking rollers and adapted to intermesh one with the other. Each gear 36 has the teeth omitted from a portion of the peripheral surface thereof and these portions or surfaces of the two rollers are so arranged that as the gears rotate with the husking rollers the cut-away or toothless portions thereof will register one with the other and form between the rollers a recess into which any accumulation of husks or the like at the ends of the husking rollers will move and the further rotation of the gears will cause these husks to be gripped by the teeth thereof and discharged beneath the gears. As here shown, each of the gears 36 has a recess 37 formed in that portion of its peripheral surface adjacent to its husking roller, these recesses being so arranged that when they are brought into registration one with the other by the rotation of the gears a V-shaped space will be provided between the gears, which will extend for approximately half the width of the gear, thereby imparting to each gear an eccentric shape. This V-shaped space being arranged in line with the space between the husking rollers it will be apparent that any husks which work down to the lower ends of these rollers will find their way into the space between the gears and will be engaged by the teeth of the gears and withdrawn from the husking rollers. The ears themselves are discharged across the upper surfaces of the gears onto a suitable chute or receptacle of any kind. It will be obvious that a suitable space may be provided between the ears to receive the husks by cutting away a portion of one gear only.

While we prefer to use the transversely movable endless belt for placing the ears against the gaging device such a belt is not essential to the operation of the device and any suitable means may be provided to receive the ear and move the same transversely, and with which the resilient pressure device may cooperate. In Fig. 7 we have shown the transversely movable conveyor as comprising a single roller 38 which is placed adjacent to the opening in the table so that the ears will be moved into engagement with the same by the main conveyor and this roller is positively actuated to move the ears transversely toward the gaging devices. As here shown, the roller has a series of longitudinally extending ribs, or corrugations, to engage the ear and cause the same to be positively actuated by the roller.

The driving mechanism for the several operative parts of the machine forms no part of the present invention and therefore has not been described in detail, as obviously it may be of any suitable character.

While we have shown and described one embodiment of our invention we wish it to be understood that we do not desire to be limited to the details thereof as various modifications may occur to a person skilled in the art.

Having now fully described our invention what we claim as new and desire to secure by Letters Patent, is:

1. In a machine of the character described, a butt removing device, a conveyor to move an ear of corn toward said butt removing device, and a gaging device to position said ear with relation to said butt removing device, said gaging device comprising cooperating rollers one of which has a spiral rib and the other of which has a smooth surface.

2. In a machine of the character described, a butt removing device, a conveyor to move an ear of corn toward said butt removing device, a gaging device to position said ear with relation to said butt removing device, said gaging device comprising a lower spiral roller and an upper roller having a smooth cylindrical surface spaced a short distance from and arranged substantially parallel with said spiral roller, and means for rotating said rollers in opposite directions.

3. In a machine of the character described, a butt removing device, a conveyor to move an ear of corn toward said butt removing device, a gaging device to position said ear with relation to said butt removing device, said gaging device comprising a lower spiral roller and an upper roller having a smooth cylindrical surface spaced a short distance from and arranged substantially parallel with said spiral roller, means for rotating said rollers in opposite directions, a receptacle for a liquid, and a conduit leading from said receptacle and arranged to discharge liquid onto said upper roller.

4. In a machine of the character described, a butt removing device, a conveyor to move an ear of corn toward said butt removing device, a gaging device to position said ear with relation to said butt removing device, a transversely movable conveyor arranged to receive said ear as it is advanced by the first mentioned conveyor and move the same toward said gaging device, and a resilient pressure device arranged above said transverse conveyor to hold said ear in firm engagement therewith.

5. In a machine of the character described, a butt removing device, a conveyor to move an ear of corn toward said butt removing device, a gaging device to position said ear with relation to said butt removing device, a transversely movable conveyor arranged to receive said ear as it is advanced by the first mentioned conveyor and move the same toward said gaging device, and flat springs arranged above said transverse conveyor to engage the ear and press the same against said transverse conveyor.

6. In a machine of the character described, a butt removing device, a conveyor to move an ear of corn toward said butt removing device, a gaging device to position said ear with relation to said butt removing device, a transversely movable endless belt having its surface roughened and having its upper stretch arranged to receive the ear as it is advanced by the first mentioned conveyor and move the same toward said gaging device, and a flat spring arranged above said endless belt to engage said ear and press the same against said belt, said spring having its contact surface inclined in the direction of movement to the upper stretch of said belt.

7. In a machine of the character described, a butt removing device, a conveyor to move an ear of corn toward said butt removing device, a gaging device to position said ear with relation to said butt removing device, a transversely movable conveyor arranged to receive said ear as it is advanced by the first mentioned conveyor to move the same toward said gaging device, a resilient pressure device arranged above said transverse conveyor to hold said ear in firm engagement therewith, and a resilient husk loosening device arranged to engage said ear after it has moved beyond said transverse conveyor.

8. In a machine of the character described, a pair of husking rollers, means for rotating said rollers, and gears secured to the respective rollers and arranged to mesh one with the other, each of said gears having the teeth omitted from a portion of its peripheral surface, the toothless portions of said gears being arranged to be brought into line one with the other as said gears rotate and thus provide a space between said gears to receive husks from said rollers.

9. In a machine of the character described, a pair of husking rollers, means for rotating said rollers, and gears secured to the respective rollers and arranged to mesh one with the other, each of said gears having a peripheral recess in that side thereof adjacent to the roller to which it is connected, and said gears being so arranged that said recesses will register one with the other as said gears rotate and provide a recess between said gears to receive husks from said rollers.

10. In a machine of the character described, a pair of husking rollers, means for rotating said rollers, and gears secured to the respective rollers and arranged to mesh one with the other, one of said gears having a portion of reduced radius so arranged that when said portion is arranged adjacent to the other gear a space will be provided between said gears to receive husks from said rollers.

11. In a machine of the character described, a table having a transverse opening therein, a conveyor to move ears of corn lengthwise of said table, a butt removing device arranged at one side of said table, a pair of gaging rollers arranged at said side of said table in advance of said butt removing device, one of said rollers having a spiral rib and the other of said rollers having a smooth cylindrical surface, means for applying liquid to said gaging rollers, a transversely movable endless belt arranged in the opening in said table to receive ears of corn and move the same toward said gaging rollers, and a resilient pressure device arranged above said endless belt to press the ears against the same.

12. In a machine of the character described, a table having a transverse opening therein, a conveyor to move ears of corn lengthwise of said table, a butt removing device arranged at one side of said table, a pair of gaging rollers arranged at said side of said table in advance of said butt removing device, one of said rollers having a spiral rib and the other of said rollers having a smooth cylindrical surface, means for applying liquid to said gaging rollers, a transversely movable endless belt arranged in the opening in said table to receive ears of corn and move the same toward said gaging rollers, a resilient pressure device arranged above said endless belt to press the ears against the same, husking rollers to receive the ears of corn after the butts have been removed therefrom, said rollers being arranged in inclined positions to cause the ears to move down the same by gravity, gears secured to the ends of the respective rollers, one of said gears having a portion of relatively short radius which when adjacent to the other gear will provide a space between said gears to receive husks from said husking rollers.

13. In a machine of the character described, a table having a transverse opening therein, a conveyor to move the ears lengthwise of said table, a butt removing device at one side of said table, a pair of gaging rollers arranged at said side of said table in advance of said butt removing device, one of said rollers having a spiral rib and the other of said rollers having a smooth cylindrical surface, a feeding device arranged adjacent to the opening in said table to receive the ear and move the same toward said gaging rollers, a resilient pressure device to press the ears against said feeding device, husking rollers to receive the ears after the butts have been removed therefrom, and gears secured to the ends of the respective husking rollers, one of said gears having a portion of relatively short radius which, when adjacent to the other gear, will provide a space between said gears to receive husks from said husking rollers.

14. In a machine of the character described, a table having a transverse opening therein, a conveyor to move ears of corn lengthwise of said table, a butt removing device arranged at one side of said table, a gaging device arranged at said side of said table in advance of said butt removing device, a feeding device supported adjacent to said opening in said table to receive the ears as they are advanced by said conveyor and to move the same toward said gaging device, and a resilient pressure device arranged above said feeding device to press the ears against the same.

15. In a machine of the character described, a butt removing device, means to move an ear of corn toward said butt removing device, and a gaging device to position said ear with relation to said butt removing device, said gaging device comprising cooperating rollers, one of which has a spiral rib and the other of which has a smooth surface.

16. In a machine of the character described, a butt removing device, a conveyor to move an ear of corn toward said butt removing device, a gaging device to position said ear with relation to said butt removing device, an ear placing device provided with teeth and arranged to receive said ear as it is advanced by the conveyor and move the same towards said gaging device, and a flat spring arranged above said placing device to engage the ear and press the same against the placing device.

In testimony whereof, we affix our signatures hereto.

WILLIAM W. MORRAL.
SAMUEL E. MORRAL.